Patented Oct. 19, 1954

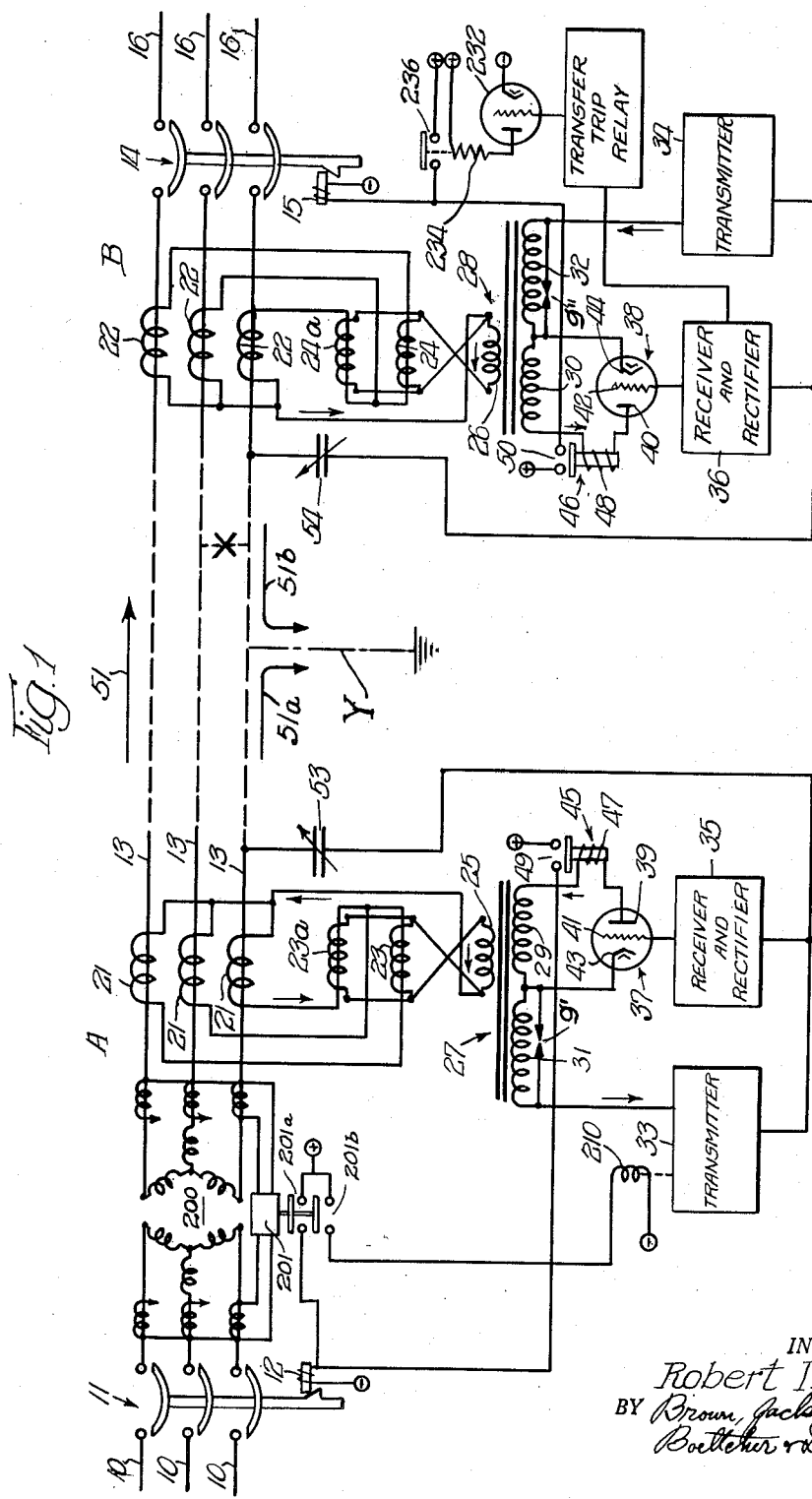

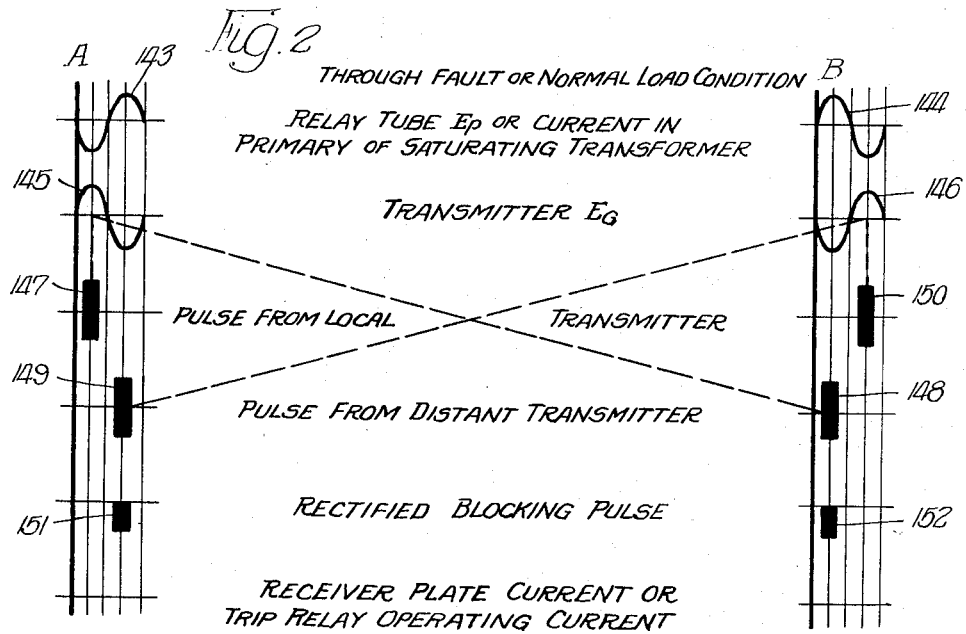
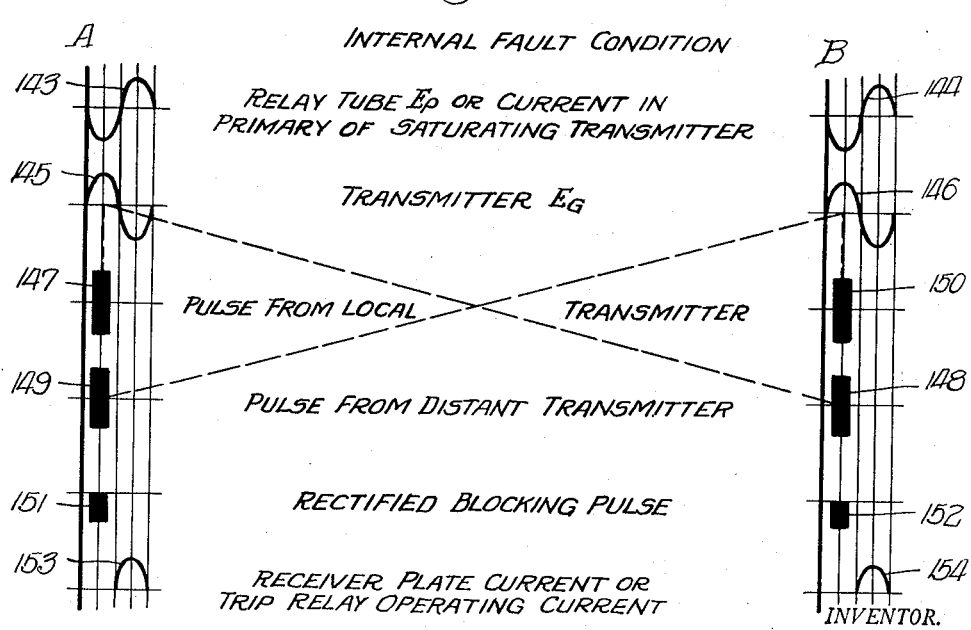

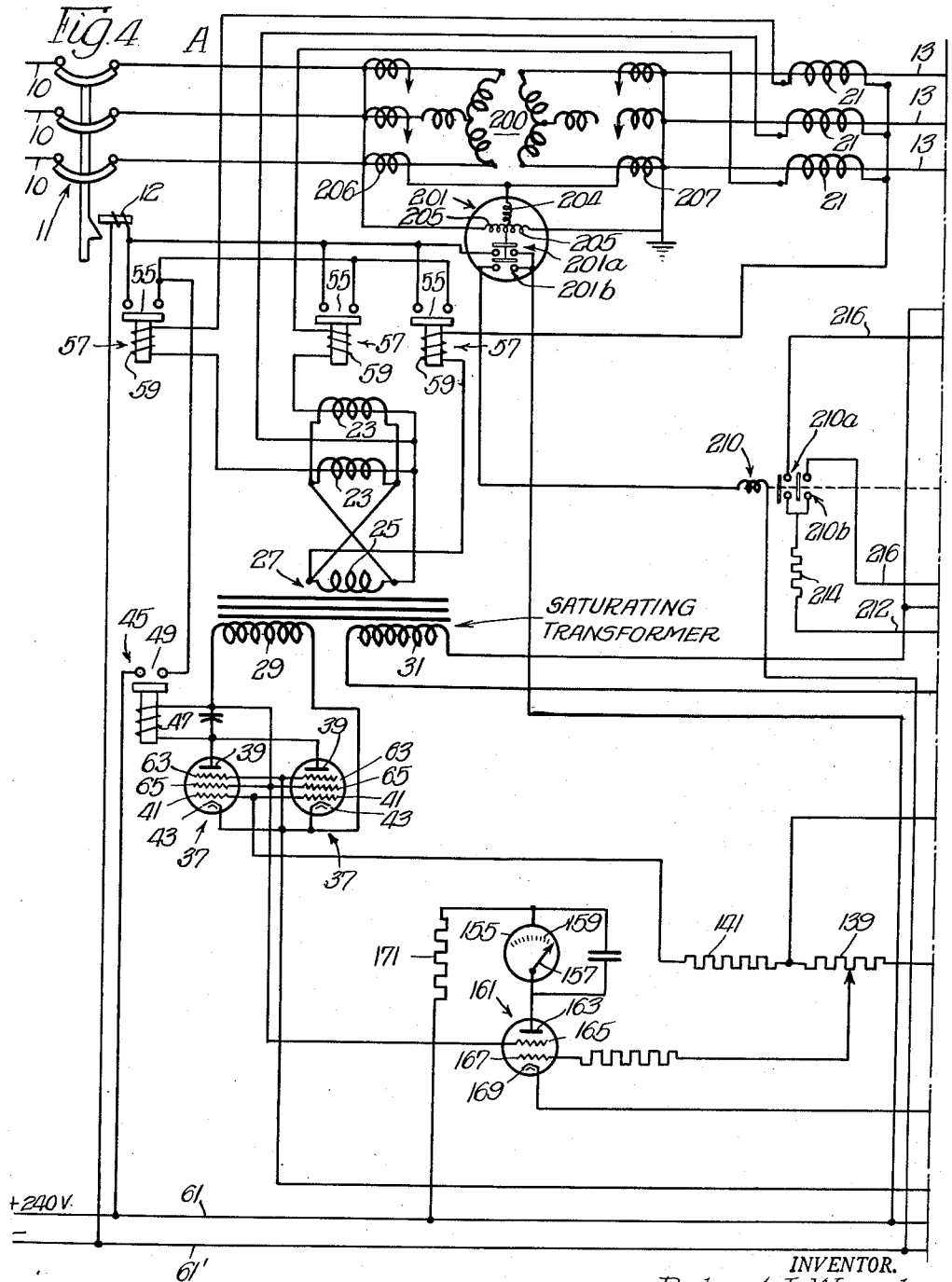

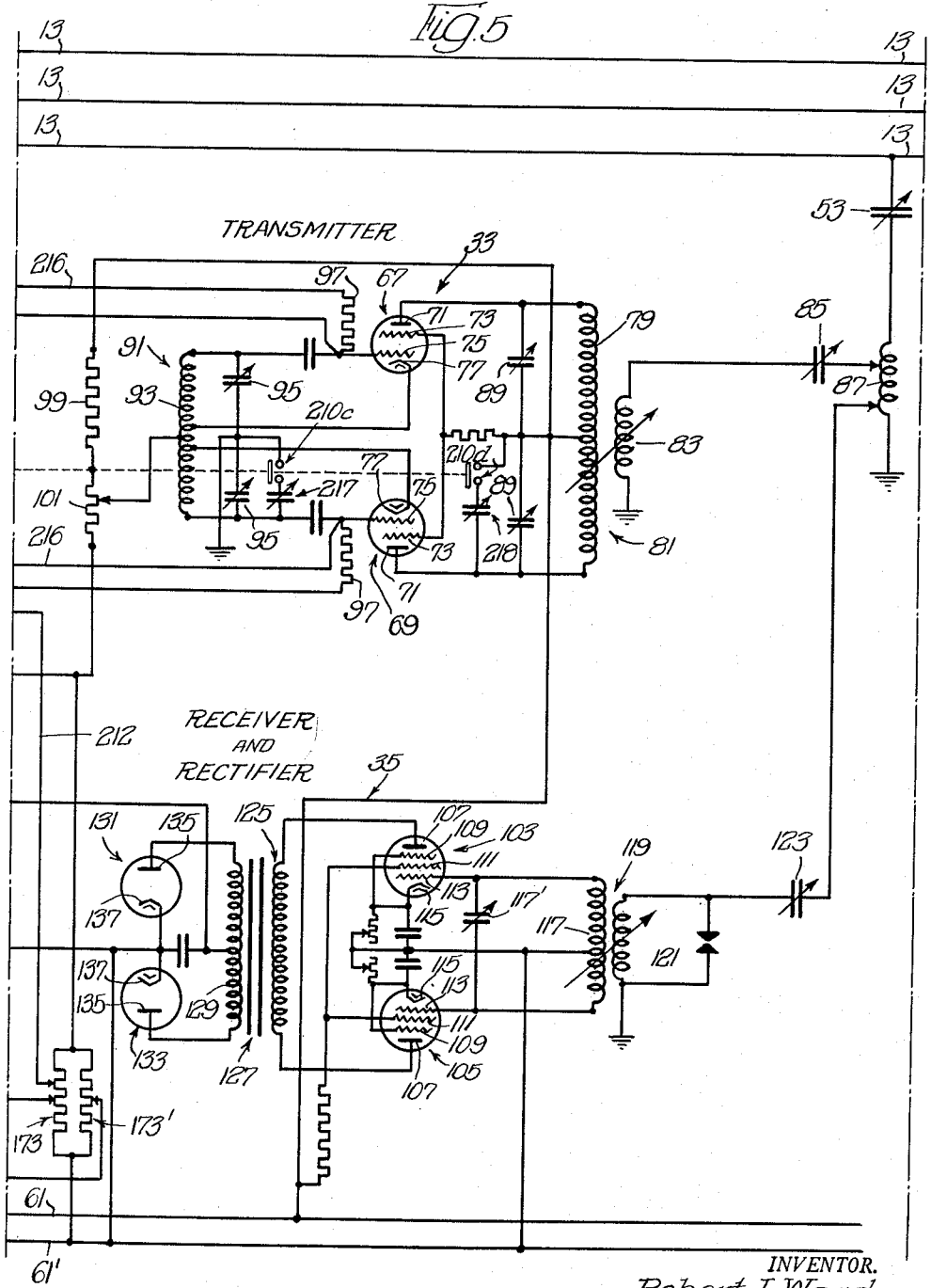

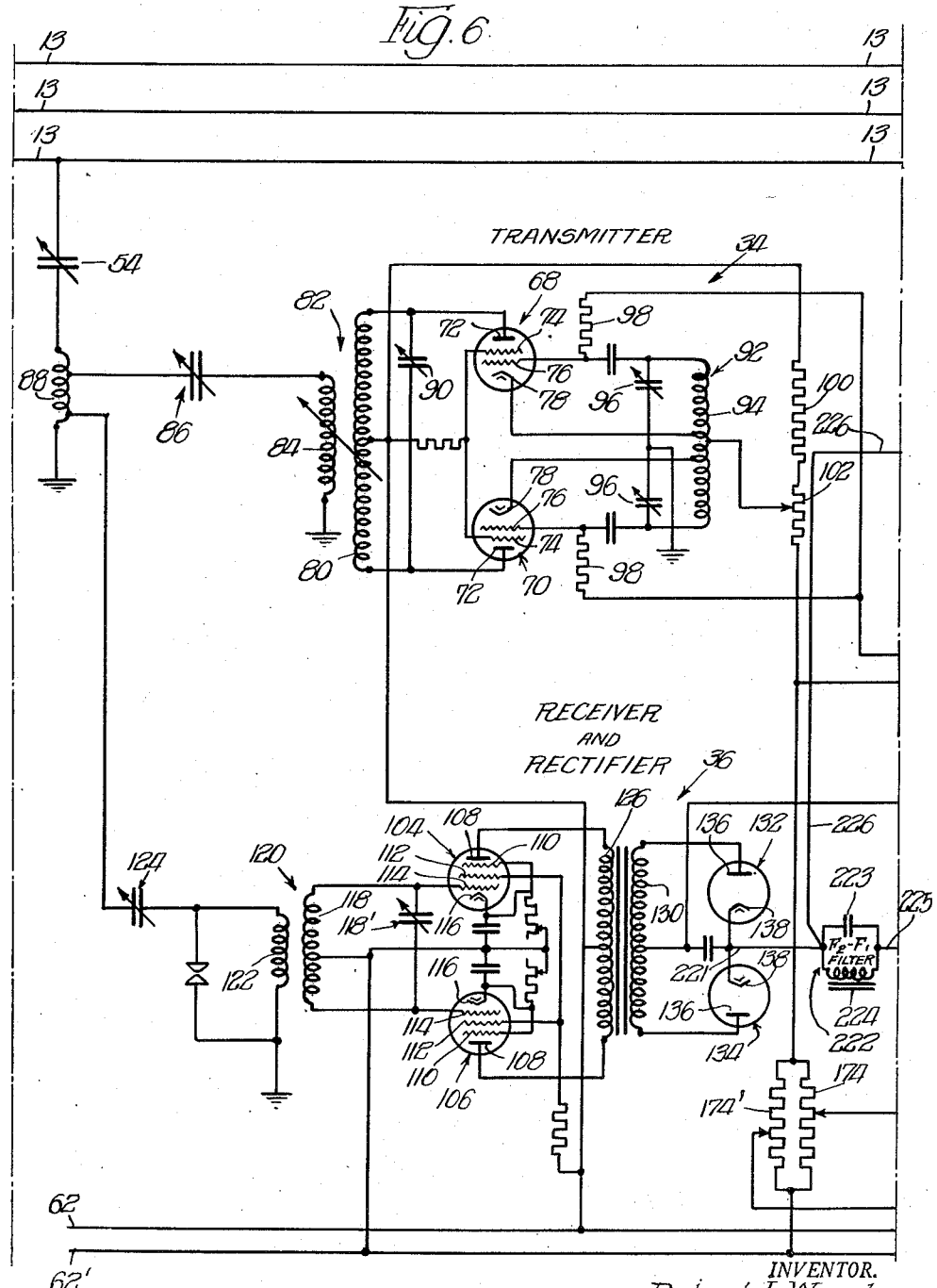

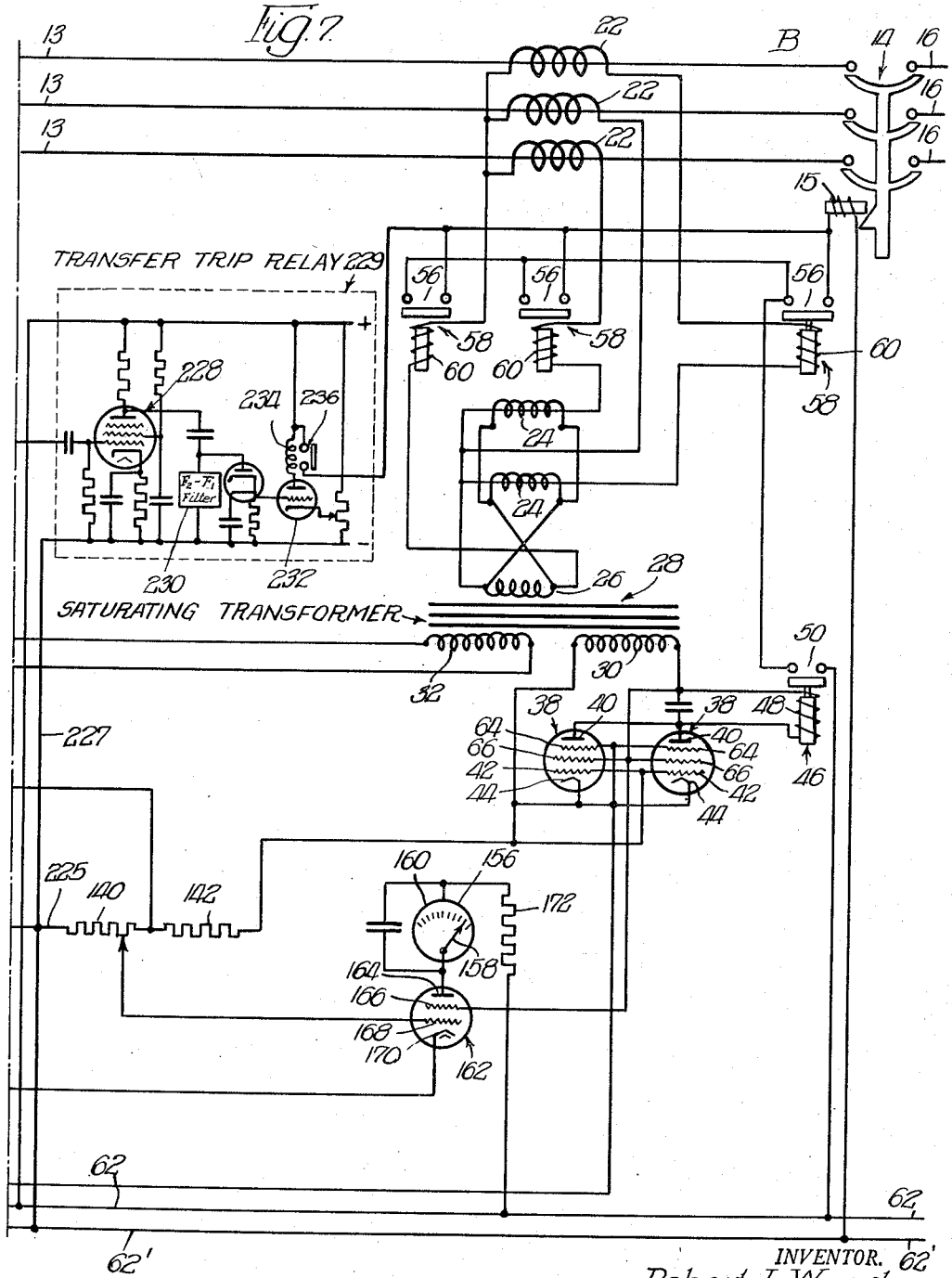

2,692,352

UNITED STATES PATENT OFFICE 2,692,352

RELAYING SYSTEM

Robert I. Ward, Itasca, Ill.

Application April 26, 1952, Serial No. 284,551

4 Claims. (Cl. 317—28)

My invention relates, generally, to relaying systems, and it has particular relation to differential relaying systems for alternating current power transmission lines in which the control from the opposite ends is effected by carrier current.

The present invention constitutes an improvement over and a further development of the differential relaying systems disclosed in my prior Patents 2,147,781 and 2,213,294, and in my copending application Serial No. 676,605, filed June 14, 1946, which has since issued on April 29, 1952, as Patent 2,594,371. In the first two mentioned prior patents I have shown how differential protection can be provided for an alternating current electric power transmission line by employing electric valves, one at each end of the line, and by controlling the conductivity of the valve at each end by certain conditions at the other end of the line. In these two prior patents, the connecting link between the two ends of the line for control purposes was provided by pilot conductors which provide a direct electrical interconnection over metallic paths.

In my aforesaid copending application, Serial No. 676,605, now issued as Patent 2,594,371, I have disclosed an improved carrier current type of relaying system wherein carrier current transmitted over the high voltage transmission conductors provides the necessary connecting link between the relays or electric valves at the ends of the transmission line. This carrier current system dispenses with the pilot conductors disclosed in my aforesaid prior patents. The system disclosed in my copending application preferably employs a phase angle comparison method of control, which responds to particular line faults, such as "internal" line faults in the section being protected.

Referring now to the improved relaying system disclosed in the present application, I have retained the above carrier current embodiment of phase angle comparison method of control for protecting the installation against line faults, but have supplemented the relaying system by a so-called "transfer trip" control for protecting the installation against power transformer faults as well. The desirability of line protection against power transformer faults can be illustrated by referring first to the type of power transmission line installation disclosed in my copending application, wherein the oil circuit breaker which responds to the protective relaying scheme is located between the power transformers and the line, as a result of which the power transformers do not need to be included in the line relaying scheme. However, in order to reduce the cost of high line installations it is oftentimes desirable and sometimes the practice to omit the line side oil circuit breakers, so that in such type of installation the lines are connected directly to the power transformers. Such installations present the problem of including the power transformer in the line relaying scheme. The additional control to take care of transformer faults requires provision for not only tripping the local oil circuit breaker on the primary side of the faulted power transformer, but tripping the remote end of the line as well. This I accomplish by my improved "transfer trip" control, which I superpose upon the carrier relaying scheme of the phase angle comparison control.

This improved transfer trip control is based upon a unique differential frequency relation which is initiated or set into operation upon the occurrence of a transformer fault, and which differential frequency relation is then transmitted to the remote end of the line over the same carrier channel that transmits the phase angle comparison control. At the remote end of the line, this differential frequency relation then acts upon a transfer trip relay for tripping the circuit breaker at that end of the line so that both ends of the line are opened upon the occurrence of the power transformer fault. The apparatus employed for maintaining the continuously functioning phase angle comparison control embodies transmitters at opposite ends of the line having continuously oscillating transmitter tubes. As a precautionary measure, each transmitter preferably employs two such tubes which oscillate at the same or substantially the same frequency, whereby if there should be a failure of one tube the phase angle comparison control will still be maintained effective by the other transmitter tube. I obtain the above transfer trip control by detuning one or both of these transmitter tubes from its normal oscillating frequency so as to establish a differential frequency relation between the two tubes, this differential frequency relation then being transmitted to the other end of the line for causing operation of the transfer trip relay as above described. This detuning operation is made to occur immediately upon the occurrence of the transformer fault, so that the differential frequency relation is made operative to effect prompt tripping of the remote end of the line. The differential or beat frequency established between the two oscillating frequencies by the detuning operation may be of relatively small magnitude, such as in the range of an audio tone signal.

From the foregoing, it will be seen that it is one of the objects of the present invention to provide an improved relaying system in which a transfer trip control, which is responsive to a power transformer faults, is superposed upon a carrier current type of phase angle comparison control which is responsive to line faults in the section. All of the operating advantages of the phase angle comparison control are retained in the new system. Furthermore, substantially the same apparatus used in the phase angle comparison control is used in the operation of the transfer trip control, so that very little additional cost is involved in the new system. Thus, my improved relaying system makes it practicable to omit the line side oil circuit breakers in a greater proportion of new installations.

Other objects, features and advantages of the invention will appear from the following detail description of one preferred embodiment thereof. In the accompanying drawings illustrating such embodiment:

Figure 1 illustrates schematically the important features of my invention;

Figure 2 illustrates, graphically, the phase relationship between the currents and voltages at opposite ends of the line and the pulses transmitted by the transmitters during through fault or normal load conditions;

Figure 3 illustrates, graphically, the relationship referred to in Figure 2 on the occurrence of an internal fault; and Figures 4, 5, 6, and 7, placed side-by-side in the order mentioned, illustrate diagrammatically the circuit connections that may be used in practicing my invention.

Referring now particularly to Figure 1 of the drawings, it will be observed that the reference character 10 designates conductors of a three phase system which may be supplied from a suitable source of alternating current, such as a 60 cycle source. The conductors 10 are arranged to be connected by a circuit breaker, indicated generally at 11 and having a trip winding 12, to energize an alternating current polyphase transmission line comprising conductors 13. As indicated by the broken lines, the conductors 13 are of indefinite lengths, for example, they may extend over several miles and even into the hundreds of miles. The conductors 13 are arranged to be connected by a circuit breaker, shown generally at 14 and having a trip winding 15, to conductors 16. The conductors 16 may be connected to another source of power or they may be connected to various load circuits or they may be connected to a combination of power source and load circuits. It will be observed that the ends of the alternating current transmission line comprising the conductors 13 are designated as A and B.

As above remarked, in my copending application Serial No. 676,605, I have disclosed a protective relaying system for the above type of power transmission line using a phase angle comparison mode of control effected from opposite ends of the line by carrier current transmission. In the type of power transmission line installation disclosed in that application, the oil circuit breaker which responds to the protective relaying scheme is interposed between the power transformers and the line, and hence the power transformers do not need to be included in the line relaying scheme. However, in order to reduce the cost of high line installations, it is sometimes the practice to omit the line side oil circuit breakers, so that in this type of installation the lines are connected directly to the power transformers. In Figure 1, I have schematically indicated this type of installation, with the power transformer 200 interposed between the oil circuit breaker 11 and the line conductors 13. Such installations present the problem of including the power transformer in the line relaying scheme. As previously described, my invention employs a carrier current type of phase angle comparison relaying system for protecting the installation against line faults. In order to protect the installation against power transformer faults as well, I superpose an additional control upon the carrier relaying scheme of the phase angle comparison control, which additional control I term a transfer trip control. This additional control requires provision for not only tripping the local oil circuit 11 upon a fault occurring in the power transformer 200, but tripping the remote end of the line as well, such as at the oil circuit breaker 14. In the following description, I shall first describe all of the apparatus functioning in the phase angle comparison relaying system for protecting the installation against line faults, and shall then describe the apparatus functioning in the transfer trip scheme for protecting the installation against power transformer faults. Cross reference is also made to my aforesaid copending application in connection with the phase angle comparison relaying system for protection against line faults.

Referring now to such latter relaying system, in the event there is an internal fault on the alternating current transmission line comprising the conductors 13, such as a short circuit between two of the conductors as indicated at X, it is desired that both circuit breakers 11 and 14 at the ends A and B of the line be opened by operation of their respective trip windings 12 and 15. This is to prevent power being fed from the conductors 10 to the fault and likewise to prevent power being fed thereto from the conductors 16 in the event that they are connected to a power source.

It is required that means be provided for distinguishing between an internal fault, such as the short circuit at X, and a through fault which is a fault that occurs outside of the alternating current transmission line comprising the conductors 13, for example, a short circuit occurring between two conductors 16. For present purposes it is desired that the relaying system be able to distinguish between through fault conditions or normal load conditions on the one hand and internal fault conditions on the other hand for the purpose of selectively operating the circuit breakers 11 and 14.

In accordance with my invention, I employ the variable conducting characteristics of a thermionic valve which comprises essentially a hot cathode, a plate and a control grid. When an alternating potential is applied to the plate and to the control grid, the valve remains in the non-conducting state when the voltage applied to the plate is 180° out of phase with the grid voltage, it being assumed of course that the magnitude of the voltages applied to the grid and plate are sufficient to maintain the valve in the non-conducting state. Now when this phase relationship is altered so that the voltages applied to the grid and plate are substantially in phase and are of sufficient magnitude, the valve will become conducting and current will flow in the plate circuit.

Provision is made, in accordance with my invention, to obtain a voltage at each of the ends A and B of the alternating current transmission line comprising conductors 13, which corresponds in magnitude and phase to the current flowing in the transmission line and the direction of power flow therein. This derived voltage or potential is employed for two purposes. One of these purposes is to control the potential applied to the plate of the thermionic valve associated with the corresponding end of the line. The other is to control the operation of a carrier transmitter whose output is applied in conventional manner to the transmission line for reception at the opposite end. The means for deriving the control potentials at the ends of the line are so connected that, during through fault or normal load conditions, the control potential at one end of the line is 180° out of phase with that at the other end.

At each end of the line there is provided a receiver and associated therewith is a rectifier which may be considered to be a part of the receiver. The receiver is arranged to receive, not only the output from the distant transmitter but also the output from the local transmitter, assuming the two transmitters to be operating on substantially the same frequency. The receiver may comprise a radio frequency amplifier and detector or rectifier. The transmitters may transmit on the same frequency. The transmitters are controlled by the derived control potential at each end so that they transmit during successive half cycles of the frequency of the alternating current applied to the line during through fault or normal load conditions. The impulse received at one end of the line from the distant station is rectified as a negative impulse or blocking pulse, and it is applied to the control grid of the thermionic valve during the half cycle that the control potential applies a positive potential to its plate. As a result the valve remains non-conducting and the relay winding in the plate circuit, connected to energize the trip winding 12 or 15 of the circuit breaker 11 or 14, is not energized.

Now, on the occurrence of an internal fault, such as the short circuit as indicated at X, the derived potential at one end of the alternating current transmission line is shifted in phase. For example, it may be shifted 180° or more in phase, depending upon the constants of the circuit at the time that the fault occurs. As a result of this phase shift the transmitted blocking signals are shifted so that they do not block conduction in the phase angle comparison tubes 37—37 and 38—38 at opposite ends of the line. Hence, these phase angle comparison tubes 37—37 and 38—38 now become conducting, energizing the relays 45—46 which trip the line oil circuit breakers 11 and 14 at opposite ends of the line. This removes the faulted transmission line from the power system.

As illustrated diagrammatically in Figure 1 of the drawing, the out-of-phase control potentials may be obtained by current transformers having secondary windings 21 and 22 at the ends A and B, respectively, of the transmission line comprising the conductors 13. The secondary windings 21 and 22 are connected inductively and conductively with secondary windings of transformers 23, 23a and 24, 24a respectively, and with windings 25 and 26 which constitute the primary windings of transformers 27 and 28, the cores of which are arranged to saturate on predetermined flow of current through the windings 25 and 26 so as to limit the voltage that is generated in secondary windings 29 and 30, 31 and 32 on the transformers 27 and 28, respectively. The purpose of the saturating transformers 27—28 is to protect the transmitters 33—34 and the phase angle comparison tubes 37—37 and 38—38 from the excessive voltages during external fault condition. The phase angle comparison tubes 37—38 do not conduct on through fault because of the blocking signals from the opposite ends of the line. During this half of the cycle the saturating transformer 25 or 26 is unloaded, which might permit its secondary voltage to exceed safe limits for its associated equipment. To limit this voltage, the iron of the transformer is saturated on overload conditions. If it is desired to further protect the equipment, spark gaps $g'$ and $g''$ may be provided across either or both secondaries to limit the peak voltage. The auxiliary current transformers 23—23a and 24—24a have different ratios so as to provide a single phase component of current from a three phase system. For example, the auxiliary transformers 23a and 24a may each have a ratio of 2 to 1, and the auxiliary transformers 23 and 24 may each have a ratio of 4 to 1. The polarities of these current transformers are so connected that their secondary currents add vectorially in the primaries of the saturating transformers 27 and 28. This current is 43% of the secondary current of the line current transformers when the above phase currents are balanced. In Le Clair et al. Patent No. 1,919,231, and also in my prior Patent 2,023,653 (page 4, column 2, lines 26–27) there is set forth an explanation of the functioning of the windings 21 through 26, just referred to, and, accordingly, a more complete description of the manner in which the connections are made and the phase relationships of the current flowing therein will not be set forth. It will be understood also that suitable networks, such as sequence filters, can be used to supply current for saturating transformers 27 and 28.

The ends A and B of the transmission line have associated therewith transmitters 33 and 34. In general, the transmitters 33 and 34 are of conventional construction and both are arranged to transmit at the same frequency which, for carrier current purposes, is in the range from approximately 50 to 300 kilocycles. Receivers and rectifiers 35 and 36 are associated with each end of the transmission line and they are arranged to receive and rectify impulses received from the opposite or distant end of the line or transmitters 33 and 34.

The phase angle comparison tubes or valves are indicated, generally, at 37 and 38 for each end of the line. In general, each of the valves 37 and 38 comprises, respectively, a plate 39—40, a control grid 41—42, and a hot cathode 43—44. As will appear hereinafter, a multigrid tube is used, but, for purposes of simplification, the additional grids are not shown in Figure 1. Control relays, indicated generally at 45 and 46, have operation windings 47 and 48 connected to the plates 39 and 40, respectively. They have normally open contacts 49 and 50 which are arranged to energize trip windings 12 and 15.

For purposes of illustration, it will be assumed that power flows in the transmission line comprising conductors 13 from A to B, as indicated by the arrows 51. Further, it will be assumed that through fault or normal load conditions exist. Under these assumed conditions, during the half cycle of the 60 cycle alternating current that is being applied by the secondary winding 31 to control the transmitter 33, it may be assumed further that this half cycle is positive. During this half cycle the transmitter 33 applies an impulse to one of the conductors 13 through a variable capacitor 53.

During this half cycle the conditions are such that the secondary winding 29 applies negative potential to the plate 39 of the valve 37.

At the other end of the line, during the half cycle just referred to, while the transmitter 33 is transmitting, the secondary winding 32 of the transformer 28 applies negative potential to the transmitter 34 and, consequently, it does not transmit. During this same half cycle the secondary winding 30 applies a positive potential to the plate 40 of the valve 38. However, since the impulse transmitted from the transmitter 33 is received and rectified by the receiver and rectifier 36 and is applied to the control grid 42 in the form of a negative pulse, the valve 38 is effectively blocked from conducting. During the next half cycle when the transmitter 33 is not transmitting and the transmitter 34 is transmitting, the polarities previously referred to are reversed. The valve 37 is prevented from becoming conducting by the negative pulse applied to its control grid 41 which originates in the transmitter 34. Accordingly, the valve 37 is maintained in the non-conducting state. Since negative potential is applied to the plate 40 during this particular half cycle, the valve 38 is rendered non-conducting. It will be noted that the transmitter 34 applies its output to one of the conductors 13 through a variable capacitor 54.

In Figures 4, 5, 6 and 7 of the drawings the circuit connections, illustrated schemactically in Figure 1, are shown in detail. It will be noted that the contacts 49 and 50 of the control relays 45 and 46 are connected in series with paralleled contacts 55 and 56, respectively, of fault detecting relays, indicated, generally, at 57 and 58 which have operating windings 59 and 60. The operating windings 59 and 60 are connected, as shown, in series circuit relation with the secondary windings 21 and 22, so that on the occurrence of predetermined fault conditions operation of the relays 59 and 60 is effected. It will be noted that, on operation of the relays 45 and 46, the respective trip windings 12 and 15 are not energized unless one of the relays 57 or 58 is also operated to complete the energizing circuit. If desired, the fault detecting relays 57 and 58 may be used to start and stop the transmitters 33 and 34 so that intermittent rather than continuous operation thereof is afforded.

Any suitable source of control voltage can be used, not only for energizing the trip windings 12 and 15, but also for applying the necessary control potentials for the various thermionic valves that are used. As illustrated, at end A conductors 61, 61' represent the conductors of a 240 volt direct current bus. Likewise, at end B conductors 62, 62' represent a similar bus.

Each of the phase angle comparison tubes or valves 37 and 38 has a duplicate valve connected in parallel circuit relation therewith. The reason for this is to prevent any impairment in the operation of the system should one of the valves 37 or 38 fail for any reason. It will be noted that each of the valves 37 and 38 is provided, respectively, with a suppressor or grid 63—64 and a screen grid 65—66.

The transmitters 33 and 34 include electric valves 67—68 and 69—70, respectively, which are connected in push-pull or parallel relation. Two valves are provided for each transmitter, so that in the event that one of them fails the operation of the system will not be impaired. In the adaptation of my improved trip control to the phase angle comparison control which I have been describing thus far, I utilize the two tubes 67 and 69 of transmitter 33 to generate the transfer trip signal, such being an audio frequency tone signal, as I shall later describe. Each of the valves 67—68 and 69—70 comprises, respectively, a plate 71—72, a screen grid 73—74, a control grid 75—76, and a hot cathode 77—78. The plates 71 and 72 are connected to the ends of a primary winding 79—80 of transformers 81—82, having secondary windings 83—84. As shown, the secondary windings 83—84 are connected through variable capacitors 85—86 to inductors 87—88 which are connected to the variable capacitors 53—54, previously referred to. Variable capacitors 89—90 are provided for the purpose of tuning the plate circuits of the valves 67—68 and 69—70.

During the operation of the phase angle comparison control, the frequency of the transmitters 33 and 34 is controlled by oscillating circuits 91—92 which comprise, respectively, inductors 93—94 and variable capacitors 95—96. The control potential is applied to the control grids 75—76 through resistors 97—98 from secondary windings 31—32 of the saturating transformers 27—28. The necessary biasing voltages for the transmitters 33 and 34 are provided from the sources 61' and 62' through resistors 99—100 and variable resistors 101—102.

Each of the receivers comprises electric valves 103—104 and 105—106. They are connected in conventional manner to form dual radio frequency stages. In the event of failure of one of the valves in each receiver then the system will continue to function using the other valve alone. The valves 103—104 and 105—106 comprise, respectively, plates 107—108, suppressor grids 109—110, screen grids 111—112, control grids 113—114 and hot cathodes 115—116. The incoming signals are applied to the control grids 113 and 114 from secondary windings 117—118 of transformers 119—120 which have primary windings 121—122 that are connected through variable capacitors 123—124 to the variable inductors 87—88. Variable capacitors 117'—118' serve to tune the circuits to the control grids 113—114 to the desired frequency of the transmitters 33—34.

The outputs of the valves 103—105 and 104—106 are applied to primary windings 125—126, respectively, of transformers 127—128 which have center tapped secondary windings 129—130. The secondary windings 129—130 are connected to rectifier valves 131—132 and 133—134 which comprise the rectifier previously referred to. The rectifier valves 131—132 and 133—134 comprise, respectively, plates 135—136 and hot cathodes 137—138. The outputs of the rectifier tubes 131—133 and 132—134 are applied across resistors 139—140 and thereby through resistors 141—142 to control grids 41—42 of electric valves 37—38.

In Figure 2 of the drawings the operation of the differential relaying system using carrier current phase angle comparison control as described thus far in Figures 4, 5, 6 and 7 of the drawings is shown graphically. The illustration in Figure 2 is for through fault or normal load conditions. Sine waves 143—144 may be taken to represent, respectively, the voltages applied to the plates 39—40 of the valves 37—38 or to represent the current flowing in the primary windings 25—26 of the transformers 27—28. It will be noted that these sine waves 143—144 are 180° out of phase with each other.

Curves 145—146 represent the voltages that are applied by the secondary windings 31—32, respectively, to the control grids 75—76 of the transmitter valves 67—69 and 68—70. For illustrative purposes the curves 145—146 are shown as sine waves. However, the wave form will be distorted under fault conditions resulting from saturation of the cores of transformers 27 and 28. It will be noted that these waves 145—146 also are 180° out of phase with each other under the conditions assumed. Since the transmitters 33—34 can transmit only when their control grids are positive, during the first half cycle of the alternating current here under consideration, the transmitter 33 is transmitting while the transmitter 34 is not. This results in a pulse 147 being applied by the transmitter 33 to its receiver and rectifier 35 and a similar pulse 148 being applied to the distant receiver and rectifier 36. During the next half cycle the transmitter 33 does not function while the transmitter 34 transmits. It transmits a pulse 149 to the opposite end of the line and a local pulse 150 which is received by its receiver and rectifier 36. It will be understood that the pulses 147—148 in reality constitute a single pulse and that each is made up of a number of waves of the carrier frequency. They are shown separately for illustrative purposes. The same comment applies to the pulses 149—150 from the transmitter 34. The pulses 149—148 are rectified by the rectifier tubes 131—133 and 132—134 respectively. The rectifier blocking pulses are indicated at 151 and 152 for each end of the line.

Now it will be observed that, during the half cycle that the transmitter 33 is transmitting, a rectified blocking pulse 152 is applied to the control grids 42 of the valves 38. During this half cycle, as illustrated in Figure 1, the plates 40 of these valves are positive. However, because of the negative blocking pulse 152 being applied thereto during this half cycle, the valves 38 are rendered non-conducting. Also, during this half cycle, since the plates 39 of the valves 37 are negative, they are not rendered conductive. Likewise, during the next half cycle, when the plates 39 of the valves 37 are positive, the rectifier blocking pulse 151 is applied to the control grids 41 and the valves 37 are effectively blocked from conducting current. During this half cycle the plates 40 of the valves 38 are negative, so that these valves are maintained in the non-conducting state.

Thus, it will be apparent that as long as through fault or normal load conditions exist, the valves 37 and 38 will be maintained in the non-conducting state and windings 47—48 of the relays 45—46 will not be energized. This is due to the fact that a negative blocking pulse is applied to the valves 37—38 from the opposite end of the line during each of the half cycles that the plates 39—40 thereof are positive.

Now reference may be had to Figure 3 of the drawings to indicate what takes place on the occurrence of internal fault conditions. It will be assumed that the power flow is in the direction indicated by the arrow 51 in Figure 1, and that the internal fault is represented by a short circuit between the conductors 13, as indicated at X; or alternatively by a short between one of the conductors and ground, as indicated at Y, in which case current would flow from opposite ends of the line to the ground fault, as represented by the arrows 15a and 15b. Under these assumed conditions the sine waves 143—144, instead of being out of phase with each other, as indicated in Figure 2, are brought into phase with each other, as indicated in Figure 3. Likewise, the voltages represented by the sine waves 145—146 applied to the transmitters 33—34 are in phase with each other. The transmitter 34 transmits during the same half cycle that the transmitter 33 transmits, so that both transmitters are transmitting in the half cycle that the plates 39 and 40 of the valves 37 and 38 are negative. During the next half cycle when the plates 39—40 are positive, no impulse is transmitted by either transmitter 33 or 34. Consequently, the valves 37—38 are unblocked and current flows in their plate circuits, as indicated by the waves 153—154 in Figure 3. The windings 47—48 of the relays 45—46 are energized and contacts 49—50 thereof are closed. Assuming further that the fault is of such character that one of each of the relays 57 and 58 is energized, the circuits for energizing the trip windings 12 and 15 will be completed through contacts 55 and 56. The circuit breakers 11 and 14 are tripped and the line is disconnected at each end from the system.

It is desirable that there be an indication of the strength of the signal that is being received from the opposite end of the line. That is, it is desirable that indicating means be provided at the end A for indicating the strength of the signal that is being received from the transmitter 34 at end B and vice versa. When the system is arranged to transmit the carrier frequency from each end continuously, a continuous indication will be provided by the means now to be described.

For this purpose, indicating instruments 155—156 of the D'Arsonval type, may be provided, each having a pointer 157—158 that is movable relative to a scale 159—160. Thermionic valves 161—162 are provided for energizing the meters 155—156. The valves have screen grids 165—166, control grids 167—168 and hot cathodes 169—170. The meters 155—156 are connected in the plate circuits of the valves 161—162 and across their respective direct current busses 61—62 through resistors 171—172, and through variable resistors 173—174. Companion variable resistors 173'—174' are also connected between the negative direct current busses 61', 62' and the cathodes 43—44 and suppressor grids 63—64 of the tubes 37—38.

With neither of the transmitters 33 or 34 transmitting, the voltage applied to the plate circuits of the valves 161—162 is adjusted so that the pointers 157—158 have substantially a full scale deflection. Now during the half cycle that the local transmitter is transmitting, the valves 161—162 are blocked so that they are non-conducting. This is due to the relatively high negative bias applied to their screen grids 165—166. During the next half cycle the screen grids 165—166 are positive, and hence render the valves 161—162 conducting. The degree that the valves 161—162 are rendered conducting depends upon the magnitude of the rectified negative blocking pulse which is applied across the resistors 139—140 by the transmitters at the opposite ends of the line. Consequently, during this half cycle the pointers 157—158 are deflected less than full scale. The meters 155—156 can be calibrated so that there will be zero deflection when the strength of the received signal is at a maximum. Therefore, the position of the pointers 157—158 between their zero positions and full scale deflections will be indicative of the strength of the individually received signal from the opposite end of the line.

It will be understood that the differential relay system using carrier current control disclosed herein may be defined as a pulse modulation system. However, it will be understood that frequency modulation or amplitude modulation can be employed instead of pulse modulation.

The foregoing concludes the description of the phase angle comparison relaying arrangement for protecting the system against line faults. I shall now describe the transfer trip arrangement for protecting the system against faults arising in the power transformer 200. Faults arising in this transformer 200 are arranged to cause operation of a transformer differential relay 201 of conventional or any desired design. This relay comprises a cooperative relation of differential coils 204—205 so arranged that a fault in the power transformer 200 energizes the operating coil 204 of the relay. The current in this operating coil 204 is the difference between the currents from the current transformers 206 and 207. Under normal conditions, these currents are balanced or equal. If power is consumed by a fault in the power transformer 200, these currents become unbalanced, and the unbalance current flows in the operating coil 204 of the relay 201. The fault current may be large enough to actuate the differential relay 201, and yet not be of sufficient magnitude to operate the regular line relaying arrangement utilizing the phase angle method of control previously described. For example, the differential relay 201 responsive to power transformer 200 is usually much more sensitive than the line relays. Accordingly, some form of signal transmission must be available to communicate to the opposite end of the line the fact that the differential relay 201 has operated, in order that the line may be de-energized. The amount of damage that will ensue to the power transformer 200 upon the occurrence of a fault therein will depend upon the length of time that the transformer remains energized after being faulted.

The operation of the differential relay 201 closes two sets of normally open relay contacts 201a and 201b, the contacts 201a energizing the tripping coil 12 of the oil circuit breaker 11 for instantly opening the line at the local end, and the other relay contacts 201b energizing the winding of the transfer trip auxiliary relay 210. This auxiliary relay comprises four sets of normally open relay contacts 210a, 210b, 210c and 210d which move to closed positions upon the energization of this auxiliary relay. The contacts 210a and 210b place a more positive bias on the control grids 75—75 of the two transmitter tubes 67—69, this more positive bias being taken from the adjustable tap on the voltage divider 173 through conductor 212, resistor 214, relay contacts 210a and 210b and conductors 216 to the control grids 75—75, thereby taking the control away from the phase comparison circuit and providing continuous oscillation of the transmitter tubes. The closing of the third set of relay contacts 210c introduces the variable capacitor 217 in shunt across the variable capacitor 95 in the tuned control grid circuit of oscillator tube 69; and the closing of the fourth set of relay contacts 210d introduces the variable capacitor 218 in shunt across the variable capacitor 89 which is in the tuned plate circuit of oscillator tube 69. Prior to the operation of the transfer trip auxiliary relay 210 and the closing of the relay contacts 210c and 210d, the two oscillator tubes 67 and 69 oscillate at the same frequency, as disclosed in my copending application. The tank coils and tuned circuits of the transmitter are loosely coupled so that the failure of one circuit or tube will not detune or retune the remaining oscillator, only sufficient coupling being required to keep the two oscillators in synchronism. During this phase angle comparison operation of the system, both oscillators are operated at the same frequency. Since these oscillators are loosely coupled, they may be operated at different frequencies, provided the circuit constants differ sufficiently to over-ride the effect of the loose coupling. The transfer trip operation, brought about by the energization of the relay 210 and the closing of the contacts 210c and 210d, causes the two oscillators to operate at different frequencies. In this transfer trip operation, the oscillator 69 is slightly detuned from its normal channel frequency by the introduction of the above capacitors into the tuned circuits. For example, if the normal channel frequency is 100 kc., the oscillator 67 will be tuned to this frequency ($f1$) and will continue to operate at this frequency, but the other oscillator 69, by reason of the detuning operation, will operate at some other frequency ($f2$) which may be above or below $f1$. For example, this frequency $f2$ may be 101 kc. The difference, $f2-f1$, or 1 kc. will be effective at the remote end receiver as an audio tone of 1 kc. This suggested frequency difference of approximately 1 kc. is merely illustrative, because the introduction of the capacitors 217 and 218 into the tuned circuits can be made to change the frequency of these circuits to any desired degree, depending upon the circuits and capacitors used, etc. For example, if crystal control is used to control the oscillators 67 and 69, the difference between the normal or original frequency $f1$ of the oscillator 67 and the changed frequency $f2$ of the oscillator 69 may be reduced appreciably. These two frequencies $f1$ and $f2$ are transmitted simultaneously over the line to the remote terminal thereof. At that end of the line, the receiver 36 receives the dual signal. This dual signal is rectified at the receiver detector consisting of the two rectifiers 132—134 connected back to back. The beat signal $f2-f1$ is applied through the filter 222 which is pretuned to this frequency ($f1-f2$) or ($f2-f1$). This filter 222 is a high Q filter which permits high attenuation of all except the proper signal. From this filter the signal is conducted through conductors 226, 227 to the amplifier tube 228 of transfer trip relay network 229, where it is amplified and then again further filtered in filter 230 to prevent unwanted signals passing to the relay tube 232. This latter filter 230 is also provided with a time delay circuit to prevent operation on noise due to switch arcs, etc. This filter 230 can be made more effective by using a crystal frequency control if necessary. The signal from the filter 230 is used to place a positive bias on the relay tube 232, which operates the plate circuit relay 234. The contacts 236 of this relay 234 energize the trip winding 15 and trip the oil circuit breaker 14. The components and connection of the transfer trip relay network 229 will be well understood by those skilled in the art from the illustration thereof in Figure 7.

In order to have the system operate with maximum effectiveness and reliability, particularly to have the transfer trip respond immediately to faults in the power transformer 200, it is desirable that the receivers 35 and 36 at both ends of the line remain energized at all times. The transmitters 33 and 34 may normally stand idle, or they may be operating at all times in the performance of the phase angle comparison control. I wish it to be understood that one end of the line might operate at one frequency and the other end of the line at another frequency. Also, transistors may be used in place of heated cathode tubes, wherever applicable. My improved system enables a transfer trip signal to be transmitted over a carrier relaying scheme with minimum complexity and cost of equipment, and with the greatest reliability. Heretofore, existing systems have used tone modulation to transmit an audio tone to a tone receiver at the remote end of the line. This requires the addition of modulating equipment which in turn reduces the reliability of the relaying equipment. In the present invention, I have modified or reconstructed the carrier relaying scheme of my prior application Serial No. 676,605 to provide a transfer trip signal to be transmitted to the remote end of the line without the addition of modulating equipment, or without very extensive modification of the carrier relaying scheme. This application is a continuation-in-part of my copending application Serial No. 676,605.

While I have illustrated and described what I regard to be the preferred embodiment of my invention, nevertheless it will be understood that such is merely exemplary and that numerous modifications and rearrangements may be made therein without departing from the scope of the invention.

I claim:

1. In a protective relaying system for an alternating current polyphase transmission line having a circuit breaker at each end, a power transformer at one end located between the adjacent circuit breaker and the line, and tripping means for tripping said circuit breakers, the combination of a phase angle comparison type of protecting apparatus at each end of the line comprising phase angle comparison tubes, carrier current transmitters and receivers at opposite ends of the line for establishing carrier communication over said line between said phase angle comparison tubes, each of said carrier current transmitters comprising two oscillator tubes, means responsive to an internal fault condition on the line for changing the phase angle relation in said phase angle comparison tubes, means responsive to said changed phase angle relation for operating said tripping means to trip said circuit breakers at both ends of the line, said two oscillaltor tubes normally oscillating at substantially the same frequency during all normal load conditions and internal-fault conditions on the line, transfer trip means comprising relay means responsive to a fault condition in said power transformer for tripping the circuit breaker at that end of the line and for also causing the two oscillator tubes in the adjacent transmitter to oscillate at two different frequencies and to transmit these two frequencies to the remote end of the line, and means at the remote end of the line responsive to the beat frequency produced between said two different frequencies for tripping the circuit breaker at that end of the line.

2. In a protective relaying system for an alternating current polyphase transmission line having a circuit breaker at each end, tripping means for tripping said circuit breaker, and a power transformer at one end of the line located between the associated circuit breaker and the line, the combination of protecting apparatus at each end of the line comprising a relay tube controlling said tripping means, said relay tube including plate and grid circuits, a carrier current transmitter operatively connected with the line for transmitting carrier pulses to the control grid circuit of the relay tube at the other end of the line, a carrier-current receiver operatively connected with the line for receiving the carrier pulses from the far end of the line and applying them as negative blocking pulses to the control grid of the associated relay tube during normal load conditions on said line, potential deriving means operatively connected with the line for supplying phase angle comparison potentials to the plate circuit of said relay tube and to said carrier-current transmitter, said carrier-current transmitter comprising two transmitting tubes each having a control grid connected with said potential deriving means, and having a plate circuit coupled in carrier transmitting relation with one of the conductors of said transmission line for transmitting carrier pulses over said line, said two transmitting tubes normally oscillating at substantially the same frequency during all normal load conditions and all through-fault and internal-fault conditions on the transmission line, said carrier-current receiver comprising a receiving tube having a control grid operatively connected to receive the carrier pulses which are carrier transmitted from the other end of the line, and having a plate circuit operatively connected with the grid circuit of said relay tube, said carrier-current transmitters transmitting carrier pulses over said line from opposite ends thereof continuously in alternate half cycles throughout all normal load conditions and through-fault conditions, and transmitting said carrier pulses in the same half cycle during internal fault conditions on the line, and transfer trip apparatus comprising relay means responsive to a fault condition in said power transformer for tripping the adjacent circuit breaker and for causing the two transmitting tubes in the adjacent transmitter to operate at two different frequencies and to transmit these two different frequencies over the carrier channel to the remote end of the line, and means at the remote end of the line responsive to the beat frequency produced between said two different frequencies for tripping the circuit breaker at the remote end of the line.

3. In a protective relaying system for an alternating current transmission line having a circuit breaker at each end, tripping means for tripping said circuit breaker, and a power transformer at one end of the line located between the adjacent circuit breaker and the line, the combination therewith of protecting apparatus at each end of the line comprising an alternating current phase angle comparison tube comprising plate and grid circuits, a carrier-current transmitter operatively connected with the line for transmitting a modulated carrier frequency in the form of carrier pulses to the control grid circuit of the phase angle comparison tube at the other end of the line, a carrier-current receiver operatively connected with the line for receiving the carrier pulses from the far end of the line and including means for applying such pulses as negative pulses to the grid circuit of the associated phase angle comparison tube, potential deriving means operatively connected with the line for supplying first and second alternating current phase angle comparison potentials, means for feeding one of said alternating current comparison potentials to the plate circuit of said phase angle comparison tube, means for feeding the other of said alternating current comparison potentials to said carrier-current transmitter for modulating the carrier frequency to produce the aforesaid carrier pulses for transmission to the other end of the line, said phase angle comparison tube being normally conductive when the positive half cycles of said alternating current comparison potential are impressed upon said plate circuit unless said carrier pulses from the other end of the line are impressed on said grid circuit in time phase with said positive half-cycles to function as negative blocking pulses, means responsive to internal fault conditions on the line for shifting the time phase of said carrier pulses so that they cannot function as blocking pulses with respect to said positive half-cycles, whereby plate current flow occurs through said phase angle comparison tube under internal fault conditions, means thereupon responsive to plate current flow through said comparison tube for causing operation of said tripping means, said carrier-current transmitter which is disposed adjacent to that end of the line having the power transformer interposed between the circuit breaker and the line comprising two oscillator tubes and cooperating tuned circuits controlling the oscillatory frequency of said latter tubes, said cooperating tuned circuits being adjusted to cause the two oscillator tubes of said transmitter to oscillate together at substantially the same frequency while the relaying system is operating normally under no-fault conditions, and transfer trip apparatus for protecting said power transformer comprising relay means responsive to a fault condition in said power transformer for tripping the circuit breaker at the adjacent end of the line, detuning apparatus responsive to said latter relay means for detuning one of said tuned circuits whereby to cause said two oscillator tubes to oscillate at two different frequencies and to transmit such two frequencies over the carrier channel to the remote end of the line, filter means at the remote end of the line for separating such two different frequencies from the phase angle comparison pulses, and means at the latter end of the line responsive to the beat frequency produced between said two different frequencies for tripping the circuit breaker at this end of the line.

4. In a protective relaying system for an alternating current transmission line for having a circuit breaker at each end, tripping means for tripping said circuit breaker, and a power transformer at one end of the line interposed between the adjacent circuit breaker and the line, the combination of protecting apparatus at each end of the line comprising a phase angle comparison tube having plate and grid circuits, potential deriving means operatively connected with the line for supplying an alternating current plate potential to said plate circuit at line frequency, a carrier-current transmitter for transmitting a carrier frequency over the line to the companion protecting apparatus at the other end of the line, said carrier-current transmitter comprising two tubes normally oscillating at the same frequency, means for modulating said carrier frequency to produce carrier pulses therein having line frequency, a carrier-current receiver for receiving said carrier pulses from the other end of the line and applying such pulses as control pulses to the grid circuit of the associated phase angle comparison tube, means responsive to said tube for controlling said tripping means, means responsive selectively to through-faults and internal faults in the line for controlling the phase relation between the alternating current potential applied to said plate circuit and the carrier pulses applied to said grid circuit for controlling the conductivity of said phase angle comparison tube, whereby to cause operation of said tripping means in the event of an internal fault in the line, and also to cause operation of said tripping means automatically in the event of failure of carrier-current transmission independently of line fault, and transfer trip apparatus comprising means responsive to a fault condition in said power transformer for causing said two carrier-current transmitter tubes to operate at two different frequencies and transmit these two different frequencies over the carrier channel to the remote end of the line, and means at the remote end of the line responsive to said two different frequencies for tripping the circuit breaker at this end of the line.

References Cited in the file of this patent

UNITED STATES PATENTS

| Number | Name | Date |
| --- | --- | --- |
| 2,199,168 | Cramer | Apr. 30, 1940 |
| 2,393,717 | Speaker | Jan. 29, 1946 |